(12) United States Patent
Han et al.

(10) Patent No.: US 11,532,859 B2
(45) Date of Patent: Dec. 20, 2022

(54) RECHARGEABLE BATTERY

(71) Applicant: Samsung SDI Co., Ltd., Yongin-si (KR)

(72) Inventors: Da-Un Han, Yongin-si (KR); Bong-Kyoung Park, Yongin-si (KR); Wonkyu Bang, Yongin-si (KR); Juhee Sohn, Yongin-si (KR); Hyunhwa Song, Yongin-si (KR); Jungyup Yang, Yongin-si (KR); Hyeri Eom, Yongin-si (KR); Seungjae Lee, Yongin-si (KR); Sol Choi, Yongin-si (KR); Juhyeong Han, Yongin-si (KR); Seokhun Hong, Yongin-si (KR); Jandee Kim, Yongin-si (KR); Junggyu Nam, Yongin-si (KR); Junwon Suh, Yongin-si (KR); Jeongdoo Yi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/347,063

(22) PCT Filed: Nov. 6, 2017

(86) PCT No.: PCT/KR2017/012478
§ 371 (c)(1),
(2) Date: May 2, 2019

(87) PCT Pub. No.: WO2018/084667
PCT Pub. Date: May 11, 2018

(65) Prior Publication Data
US 2020/0075921 A1    Mar. 5, 2020

(30) Foreign Application Priority Data

Nov. 7, 2016 (KR) .......................... 10-2016-0147469

(51) Int. Cl.
*H01M 50/54* (2021.01)
*H01M 10/04* (2006.01)
(Continued)

(52) U.S. Cl.
CPC ....... *H01M 50/54* (2021.01); *H01M 10/0431* (2013.01); *H01M 10/0436* (2013.01);
(Continued)

(58) Field of Classification Search
CPC ...... H01M 2/06; H01M 2/08; H01M 2/14–30; H01M 4/64–669; H01M 4/70–72;
(Continued)

(56) References Cited

U.S. PATENT DOCUMENTS 6,387,567 B1 * 5/2002 Noh ................ H01M 50/172
429/211
2004/0038125 A1    2/2004 Kim et al.
(Continued)

FOREIGN PATENT DOCUMENTS

CN    102054957 A    5/2011
CN    102064308 A    5/2011
(Continued)

OTHER PUBLICATIONS

Machine translation of Kang et al. KR 10-0870461 published Nov. 25, 2008. (Year: 2008).*
(Continued)

*Primary Examiner* — Jonathan Crepeau
*Assistant Examiner* — Jacob Buchanan
(74) *Attorney, Agent, or Firm* — Lewis Roca Rothgerber Christie LLP

(57) ABSTRACT

The present disclosure relates to a rechargeable battery including an electrode assembly that includes a first electrode, a second electrode, and a separator disposed between the first electrode and the second electrode, a first electrode (Continued)

tab that is electrically connected with the first electrode, and includes at least one first bent portion, a second electrode tab that is electrically connected with the second electrode, and includes at least one second bent portion, and exterior member that receives the electrode assembly, and a reinforcement member that is disposed in the first exterior member, while being disposed adjacent to at least one of the first electrode tab and the second electrode tab.

12 Claims, 8 Drawing Sheets

(51) Int. Cl.
  *H01M 10/0585* (2010.01)
  *H01M 50/40* (2021.01)
  *H01M 50/105* (2021.01)
  *H01M 50/183* (2021.01)

(52) U.S. Cl.
  CPC ..... *H01M 10/0585* (2013.01); *H01M 50/105* (2021.01); *H01M 50/183* (2021.01); *H01M 50/40* (2021.01)

(58) Field of Classification Search
  CPC ............... H01M 4/75; H01M 10/0431; H01M 10/045–0463; H01M 10/05–0525; H01M 50/40; H01M 50/471–486
  See application file for complete search history.

(56) References Cited

U.S. PATENT DOCUMENTS

| | | | |
|---|---|---|---|
| 2008/0241680 A1 | 10/2008 | Lee et al. | |
| 2010/0216002 A1 | 8/2010 | Tanino | |
| 2011/0104541 A1 | 5/2011 | Ahn et al. | |
| 2011/0117406 A1* | 5/2011 | Cho ................... | H01M 10/0431 |
| | | | 429/94 |
| 2011/0206976 A1 | 8/2011 | Yoo | |
| 2013/0052521 A1 | 2/2013 | Kim | |
| 2013/0330606 A1 | 12/2013 | Kwon et al. | |
| 2014/0017551 A1 | 1/2014 | Suzuki | |
| 2014/0170470 A1* | 6/2014 | Jeong ................ | H01M 10/0436 |
| | | | 429/163 |
| 2015/0111088 A1* | 4/2015 | Hiroki ..................... | H01M 2/18 |
| | | | 429/149 |
| 2015/0243962 A1 | 8/2015 | Hiroki et al. | |
| 2016/0079574 A1 | 3/2016 | Song et al. | |
| 2016/0149171 A1 | 5/2016 | Suh et al. | |
| 2016/0315294 A1* | 10/2016 | Kim ..................... | H01M 50/119 |

FOREIGN PATENT DOCUMENTS

| | | | | |
|---|---|---|---|---|
| CN | 102163736 A | | 8/2011 | |
| CN | 104094465 A | | 10/2014 | |
| CN | 104577179 A | | 4/2015 | |
| CN | 105428691 A | | 3/2016 | |
| CN | 105633305 A | | 6/2016 | |
| CN | 105900274 A | | 8/2016 | |
| JP | 2008262788 A | * | 10/2008 | ............ H01M 10/36 |
| JP | 2009-181897 A | | 8/2009 | |
| JP | 2009181897 A | * | 8/2009 | ............ H01M 10/36 |
| JP | 2010-198988 A | | 9/2010 | |
| JP | 2012-4141 A | | 1/2012 | |
| JP | 2012004141 A | * | 1/2012 | ............. H01M 2/34 |
| KR | 10-2000-0040171 A | | 7/2000 | |
| KR | 10-0280715 B1 | | 11/2001 | |
| KR | 2003-0096717 A | | 12/2003 | |
| KR | 10-2006-0097445 A | | 9/2006 | |
| KR | 10-0716596 B1 | | 5/2007 | |
| KR | 10-0870461 B1 | | 11/2008 | |
| KR | 10-2009-0010410 A | | 1/2009 | |
| KR | 10-2011-0054706 A | | 5/2011 | |
| KR | 10-2012-0014540 A | | 2/2012 | |
| KR | 10-2013-0030723 A | | 3/2013 | |
| KR | 10-2013-0051556 A | | 5/2013 | |
| KR | 10-1269973 B1 | | 5/2013 | |
| KR | 10-1297014 B1 | | 8/2013 | |
| KR | 10-2013-0133328 A | | 12/2013 | |
| KR | 10-2014-0087364 A | | 7/2014 | |
| KR | 10-2015-0040494 A | | 4/2015 | |
| KR | 10-1508416 B1 | | 4/2015 | |
| WO | 2012/131803 A1 | | 10/2012 | |

OTHER PUBLICATIONS

Machine Translation of Kobayashi, JP 2012-004141. (Year: 2012).*
Machine translation of Shinyashiki, JP 2009-181897. Originally published Aug. 13, 2009. (Year: 2009).*
Machine translation of Kato, JP 2008-262788. Originally published Oct. 30, 2008. (Year: 2008).*
Korean Office Action dated Dec. 8, 2020, KR Application No. 10-2016-0147469, 5 pages.
Office Action with English translation dated Sep. 3, 2021, including Search Report dated Aug. 29, 2021, for corresponding Chinese Patent Application No. 201780068717.1 (15 pages).
Office Action dated Apr. 27, 2022, of the corresponding Chinese Patent Application No. 201780068717.1., including English translation 14pp.
Notice of Allowance dated Sep. 23, 2022, and accompanying Search Report dated Sep. 6, 2022, of the corresponding Chinese Patent Application No. 201780068717.1, 7pp.

\* cited by examiner

RECHARGEABLE BATTERY

CROSS-REFERENCE TO RELATED APPLICATION(S)

This application is a National Phase Patent Application of International Patent Application Number PCT/KR2017/012478, filed on Nov. 6, 2017, which claims priority of Korean Patent Application No. 10-2016-0147469, filed Nov. 7, 2016. The entire contents of both of which are incorporated herein by reference.

TECHNICAL FIELD

The present disclosure relates to a rechargeable battery.

BACKGROUND ART

Recently, attention has been focused on development and commercialization of a flexible electronic device such as a flexible display, a wearable mobile phone and watch, and the like. Accordingly, demand for implementation of a flexible characteristic for a rechargeable battery, which is a power supply device, for such a flexible electronic device has increased.

In general, the rechargeable battery can be classified into a cylindrical battery, a prismatic battery, and a pouch-type battery depending on the shape of the battery. Among the batteries, various attempts have been carried out to implement flexible characteristics in the pouch-type battery in terms of high integration density, high energy density per weight, low cost, and easy deformation.

DISCLOSURE

Technical Problem

Exemplary embodiments provide a rechargeable battery having excellent flexibility and durability.

Technical Solution

In one aspect, the present disclosure provides a rechargeable battery including an electrode assembly that includes a first electrode, a second electrode, and a separator disposed between the first electrode and the second electrode, a first electrode tab that is electrically connected with the first electrode, and includes at least one first bent portion, a second electrode tab that is electrically connected with the second electrode, and includes at least one second bent portion, a first exterior member that receives the electrode assembly; a second exterior member that seals the first exterior member; and a reinforcement member that is disposed in the first exterior member, while being disposed adjacent to at least one of the first electrode tab and the second electrode tab.

Advantageous Effects

According to the exemplary embodiments, the rechargeable battery according to the present disclosure has an excellent bent characteristic, and accordingly flexibility can be significantly improved.

In addition, the rechargeable battery according to the present disclosure can assure excellent durability even after iterative bending.

MODE FOR INVENTION

Figure 1:
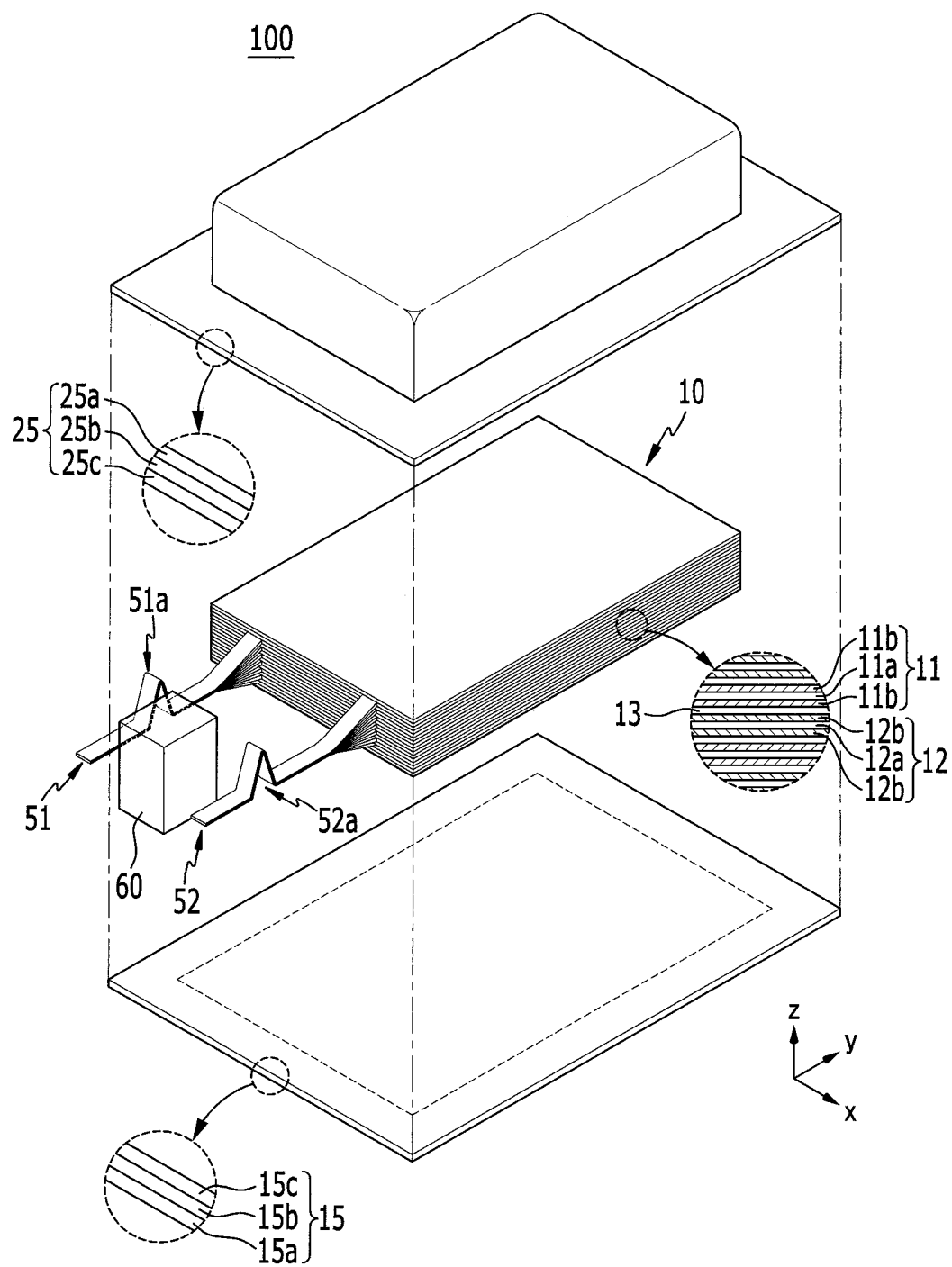
FIG. 1 is an exploded perspective view of a rechargeable battery according to an exemplary embodiment.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, since a size and a thickness of each element illustrated in the drawings are randomly illustrated for convenience of the description, the present invention is not necessarily limited to those shown in the drawings.

In addition, unless explicitly described to the contrary, the word "comprise" and variations such as "comprises" or "comprising" will be understood to imply the inclusion of stated elements but not the exclusion of any other elements.

Figure 2:
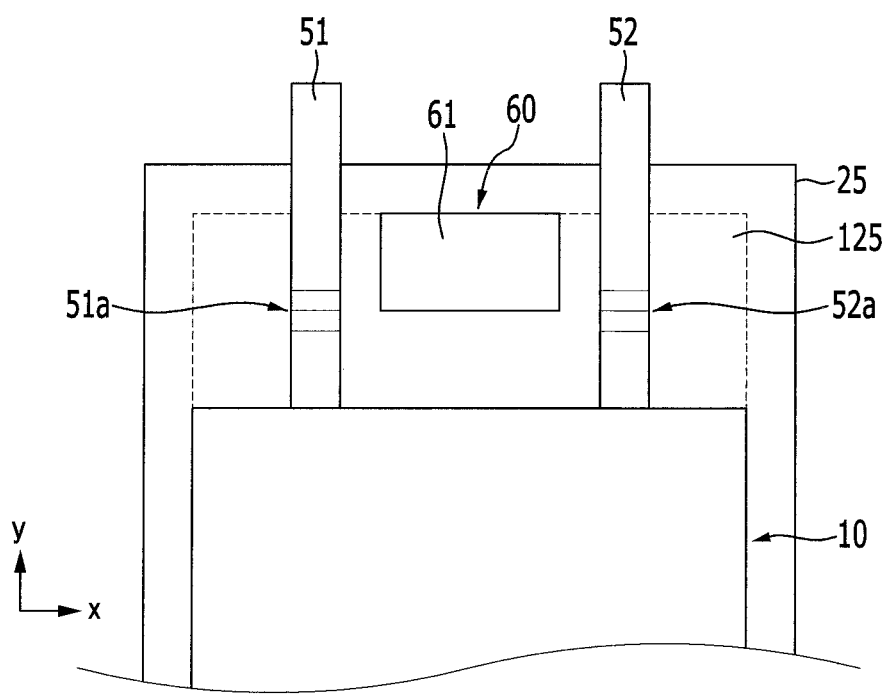
FIG. 2 is a horizontal cross-sectional view of the x-y plane in FIG. 1, when a second exterior member is removed.

FIG. 1 is an exploded perspective view of a rechargeable battery according to an exemplary embodiment, and FIG. 2 is a horizontal cross-sectional view of an x-y plane viewed in a direction of a first exterior member viewed from a second exterior member after removing the second exterior member in FIG. 1. In addition, FIG. 3 is a vertical cross-sectional view of a y-z plane of the rechargeable battery of FIG. 1, and FIG. 4 illustrates the rechargeable battery of FIG. 1 bent in one direction.

Figure 3:
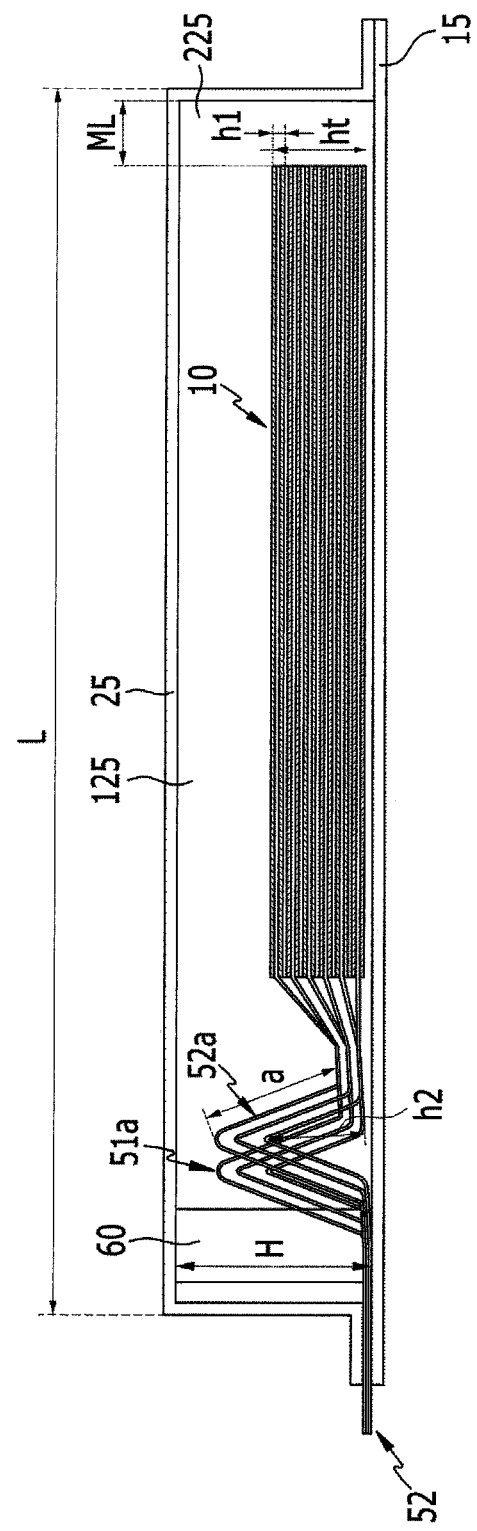
FIG. 3 is a vertical cross-sectional view of the y-z plane of the rechargeable battery of FIG. 1.
Figure 4:
FIG. 4 shows the rechargeable battery of FIG. 1, bent in one direction.
Figure 4:
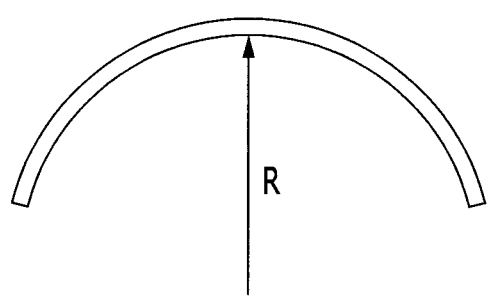

First, referring to FIG. 1 to FIG. 3, a rechargeable battery 100 according to an exemplary embodiment of the present disclosure includes an electrode assembly 10, a first exterior member 25, and a second exterior member 15. The first and second exterior members 25 and 15 receive the electrode assembly 10.

The electrode assembly 10 charges and discharges a current, and includes a first electrode 11, a second electrode 12, and a separator 13 disposed between the first electrode 11 and the second electrode 12.

As shown in FIG. 1, the electrode assembly 10 may have a structure in which a plurality of first electrodes 11 and a plurality of second electrodes 12 formed in the shape of a quadrangular sheet are alternately stacked, while disposing the separator 13 therebetween.

Although it is not illustrated, the electrode assembly 10 of the present disclosure may have a flat structure in which separators are disposed between a plurality of first electrodes and a plurality of second electrodes, each formed in the shape of a band, and are spirally wound together and then pressed.

In the present disclosure, polarities of the first and second electrodes 11 and 12 are not specifically limited. That is, the first electrode 11 may be a positive electrode and the second electrode 12 may be a negative electrode, or the first electrode 11 may be a negative electrode and the second electrode 12 may be a positive electrode. Hereinafter, it will be described that the first electrode 11 is a positive electrode and the second electrode 12 is a negative electrode for convenience of description.

The first electrode 11 may include a first coated region 11b and a first uncoated region (not shown) disposed on at least one side of a first current collector 11a.

The first current collector 11a may be formed of a thin metal plate having electrical conductivity, and includes the first coated region 11b coated with an active material and the first uncoated region that is not coated with an active material. Thus, the first uncoated region is an area where the first current collector 11a is exposed.

The first coated region 11b may be disposed at only one side of the first current collector 11a, but as shown in FIG. 1, it is preferable that the first coated region 11b is disposed on opposite sides of the first current corrector 11a such that a rechargeable battery 100 having much higher capacity can be implemented.

The first current collector 11a may be formed in the shape of, for example, a mesh or a foil. In addition, the first current collector 11a may be made of, for example, aluminum or an aluminum alloy.

The first coated region 11b may be formed by using a material that includes a compound (lithiated intercalation compound) that is capable of reversible intercalation and deintercalation of lithium, but is not limited thereto.

The first uncoated region where an active material is not coated is connected with a first electrode tab 51 such that the first uncoated region can be electrically connected with the first electrode 11. In this case, the first electrode tab 51 may be formed by extending the first uncoated region. That is, the first electrode tab 51 may be integrally connected to the first current collector 11a and then extended.

Alternatively, the first electrode tab 51 may be provided as a separate member and may be connected to the uncoated region by welding and the like. In this case, the first electrode tab 51 may be made of the same material as the first current collector 11a.

The first electrode tab 51 may be formed in the shape of, for example, a band having a predetermined width, and may include at least one first bent portion 51a.

The first bent portion 51a disperses bending stress generated when the rechargeable battery 100 is bent.

Accordingly, as shown in FIG. 3, the first bent portion 51a may be bent in the shape of "Λ", but the bending shape of the first bent portion 51a is not limited to any particular shape as long as it can disperse bending stress.

In addition, when the first electrode 11 is included in plural, the first bent portion 51a may also be included in plural. In this case, the first bent portions 51a are respectively disposed in the first exterior member 25 and the second exterior member 15, while being separated from each other. That is, since the plurality of first bent portions 51a are disposed while being separated from each other, a rechargeable battery having excellent flexibility can be more easily implemented.

The second electrode 12 may include a second coated region 12b and a second uncoated region (not shown), which are disposed at least one side of a second current collector 12a.

The second current collector 12a may be formed of a metal thin plate having electrical conductivity, and includes the second coated region 12b coated with an active material and the second uncoated region where an active material is not coated. Thus, the second uncoated region is an area where the second current collector 12a is exposed.

The second coated region 12b may be disposed on only one side of the second current collector 12a, and as shown in FIG. 1, it is preferable that the second coated region 12b is disposed on opposite sides of the second current corrector 12a such that a rechargeable battery 100 having much higher capacity can be implemented.

The second current collector 12a may be formed in the shape of, for example, a mesh or a foil. In addition, the second current collector 12a may be made of, for example, copper or a copper alloy.

The first coating region 11b is formed using a material containing at least one of a carbon material such as crystalline carbon, amorphous carbon, a carbon composite, and carbon fiber, a lithium metal, a metal oxide, and a lithium alloy, but is not limited thereto.

The second uncoated region where the active material is not coated may be connected with a second electrode tab 52 and thus the second uncoated region may be electrically connected with the second electrode 12. In this case, the second electrode tab 52 may be formed by extending the second uncoated region. That is, the second electrode tab 52 may be integrally connected to the second current collector 12a and thus extended.

Alternatively, the second electrode tab 52 may be provided as a separate member, and may be connected to the uncoated region by welding and the like. In this case, the second electrode tab 52 may be made of the same material as the second current collector 12a.

The second electrode tab 52 may be formed in the shape of, for example, a band having a predetermined width, and may include at least one second bent portion 52a.

The second bent portion 52a disperses bending stress generated when the rechargeable battery 100 is bent.

Therefore, the second bent portion 52a can be bent into a mountain form having an isosceles shape as shown in FIG. 3, but the shape of the second bent portion 52a is not particularly limited as long as it can disperse the bending stress.

In addition, when the second electrode 12 is provided in plural, the second bent portion 52a may be provided in plural. In this case, the respective second bent portions 52a are respectively disposed in the first exterior member 25 and the second exterior member 15 while being separated from each other. That is, since the plurality of second bent portions 53a are disposed while being separated from each other, a rechargeable battery having excellent flexibility can be more easily implemented.

In the electrode assembly 10, the first electrode tab 51 and the second electrode tab 52 may be alternately disposed at opposite sides in a width direction (i.e., x-axis direction in FIG. 1) at one end of the electrode assembly 10. That is, in FIG. 1, the first electrode tab 51 is disposed at one side in the x-axis direction and the second electrode tab 52 is disposed at the other side in the x-axis direction, while having a predetermined gap from the first electrode tab 51.

In addition, one end of the first electrode tab 51 and one end of the second electrode tab 52 are formed to be drawn out to the outside from one end of each of the first and second exterior members 25 and 15.

The rechargeable battery 100 according to the present disclosure has flexibility so as to be applied to a flexible electronic device. However, in case of a conventional pouch-type rechargeable battery, when the rechargeable battery is repeatedly bent, bending stress is concentrated on first and second electrode tabs having a relatively thin width and thus the first electrode tab and the second electrode tab may be easily broken.

However, in the rechargeable battery 100 according to the present disclosure, at least one first bent portion 51a and at least one second bent portion 52a are respectively provided in the first electrode tab 51 and the second electrode tab 52, and thus, even when the rechargeable battery 100 is iteratively bent, stress concentrated on the first electrode tab 51 and the second electrode tab 52 can be easily dispersed. Accordingly, the rechargeable battery 100 can be prevented from being damaged, thereby improving durability.

Meanwhile, the separator 13 separates the first electrode 11 and the second electrode 12 and provides a passage for lithium ions, and any separator may be used as long as it is commonly used in a rechargeable battery. That is, a material having low resistance against the ion movement of the electrolyte and having an excellent ability to be impregnated by the electrolyte can be used.

The separator 13 may be, for example, selected from polyester, Teflon, polyethylene, polypropylene, polytetrafluoroethylene (PTFE), or a combination thereof, and may be formed in the shape of a nonwoven fabric or a woven fabric. In addition, a separator coated by using a composition in which a ceramic component or a polymer material is included may be used to assure heat resistance or mechanical strength, and a single layer or a multilayer structure may be selectively used.

The rechargeable battery 100 according to the present disclosure has flexibility and thus may be bent in one direction. Here, the one direction may refer to any direction of the rechargeable battery 100 on the x-y plane of FIG. 1, and is not limited to a specific direction.

For example, the rechargeable battery 100 may be formed in the shape of a rectangle in a plan view, and in this case, one direction in which the rechargeable battery 100 is bent may be a long side direction or a short side direction of the rechargeable battery 100. In FIG. 4, the rechargeable battery 100 bent in the long side direction is exemplarily illustrated.

Referring to FIG. 4, the degree of bending of the rechargeable battery 100 may indicate a curvature radius R, and as the curvature radius R is increased, the rechargeable battery 100 is bent less.

The electrode assembly 10 is received in the first and second exterior members 25 and 15 having flexibility.

More specifically, the first exterior member 25 may be provided with an internal space where the electrode assembly 10 can be received. In addition, the second exterior member 15 is disposed while facing the first exterior member 25, and the first exterior member 15 seals the first exterior member 25 by being bonded to a sealing area that is disposed at edges of the first exterior member 24 and the second exterior member 25.

Referring to FIG. 3, an opening is formed at one side of the first exterior member 25 for insertion of the electrode assembly 10, and includes a receiving portion 125 and a margin portion 225.

The receiving portion 125 is an area where the electrode assembly 10 is inserted, and the margin portion 225 is an area where a length change of the electrode assembly 10 can be accommodated.

Specifically, the margin portion 225 is disposed at one side in a length direction (y-axis direction) of the first exterior member 25, and is disposed at the opposite side of the side through which the first electrode tab 51 and the second electrode tab 52 are drawn out. A vertical cross-section (the z-y plane of FIG. 1) or a horizontal cross-section (the x-y plane) of the margin portion 225 may have a quadrangular shape.

As in the present disclosure, when the margin portion 225 is included in one side of the first exterior member 25 in the length direction, a length change of the electrode assembly 10 in the length direction due to bending of the rechargeable battery 100 can be accommodated.

For example, when the rechargeable battery 100 is bent into a shape as shown in FIG. 4, the electrode assembly 10 may be bent in a state while the first electrode tab 51 and the second electrode tab 52 are fixed to one end of each of the first exterior member 25 and the second exterior member 15. In this case, since the first electrode tab 51 and the second electrode tab 52 include the first bent portion 51a and the second bent portion 52a, a length change may occur in the length direction of the rechargeable battery 100. Thus, when the margin 225 is included in the length direction of the first exterior member 25, the length change of the first and second electrode tabs 51 and 52 due to bending of the rechargeable battery 100 can be accommodated. Accordingly, the electrode assembly 10 and the rechargeable battery 100 can be smoothly bent.

The first exterior member 25 includes a first resin layer 25a, an anti-moisture layer 25b, and a second resin layer 25c that are sequentially stacked from the outermost edge.

The first resin layer 25a functions as a protective layer and is disposed at the outermost edge of the rechargeable battery 100.

The first resin layer 25a may be formed of at least one selected from a group consisting of polyethylene terephthalate, polybutylene terephthalate, polyethylene naphthalate, polybutylene naphthalate, a polyester copolymer, a polycarbonate, and a nylon film, but it is not limited thereto.

The anti-moisture layer 25b is disposed in one side of the first resin layer 25a, in which the electrode assembly 10 is disposed. The anti-moisture layer 25b is an intermediate layer, which functions as a barrier layer that can prevent a leakage of an electrolyte solution or permeation of moisture and the like. The anti-moisture layer 25b may be formed of a thin plate member.

The anti-moisture layer 25b may be formed of, for example, aluminum and an aluminum alloy.

The second resin layer 25c is disposed in one side of the anti-moisture layer 25b, and is disposed on the opposite side of the side where the first resin layer 25a is disposed. In addition, the second resin layer 25c may have insulation and thermal bonding properties.

The second resin layer 25c may be made of a polyolefin or a copolymer of a polyolefin, and more specifically, the polyolefin may be made of polyethylene (PE) or polypropylene (PP), but this is not restrictive.

The second exterior member 15 that is bonded along an edge of the first exterior member 25 is disposed in a surface of the first exterior member 25, which faces the second resin layer 25c.

The second exterior member 15 may have the same stacked structure as the first exterior member 25. That is, the second exterior member 15 includes a first resin layer 15a, an anti-moisture layer 15b, and a second resin layer 15c that are sequentially stacked from the outermost edge. Features of the respective layers are the same as those of the first resin layer 25a, the anti-moisture layer 25b, and the second resin layer 25c of the first exterior member 25, and therefore no further description will be provided.

The electrode assembly 10 is located in the receiving portion 125 of the first exterior member 25 and then a gasket is disposed at an edge of the first exterior member 25 to seal the edges of the first and second exterior members 25 and 15, or the first exterior member 25 and the second exterior member 15 may be sealed by bonding the second resin layers 25c and 15c without having a separate gasket.

Next, a reinforcement member 60 is disposed in the first exterior member 25. As described, when the reinforcement member 60 is included, a length change of the electrode assembly 10 in a thickness direction due to bending of the rechargeable battery 100 can be accommodated.

Thus, the reinforcement member 60 has a height that is higher than at least a height of the electrode assembly 10. Since the reinforcement member 60 is disposed in the first exterior member 25, the receiving portion 125 has a height that is the same as or higher than the height of the reinforcement member 60.

The reinforcement member 60 may be formed of an insulating material, and a material of the reinforcement member 60 is not limited to a specific material unless a battery function of the rechargeable battery 100 is affected.

As in the present disclosure, when the reinforcement member 60 having a height that is higher than the electrode assembly 10 is included in the receiving portion 125 where the electrode assembly 10 is embedded, a margin in the thickness direction (the y-axis direction of FIG. 1) of the rechargeable battery 100 can be assured.

For example, when the rechargeable battery 100 is bent to a shape shown in FIG. 4, the electrode assembly 10 may be bent in a state while the first electrode tab 51 and the second electrode tab 52 are fixed to one end of each of the first and second exterior members 25 and 15.

However, since the first bent portion 51a and the second bent portion 52a are disposed together at a side of the first exterior member 25 in which the first electrode tab 51 and the second electrode tab 52 are disposed, the degree to which the electrode assembly 10 can be freely deformed, that is, the degree of deformation freedom of the electrode assembly 10, can be decreased compared to the opposite side where the first electrode tab 51 and the second electrode tab 52 are not disposed, that is, a side where the margin portion 225 is located.

Thus, in the present disclosure, the reinforcement member 60 that is thicker than the electrode assembly 10 is located at a side of the receiving portion 125 in which the first electrode tab 51 and the second electrode tab 52 are disposed, and thus the freedom of change in a thickness direction of the rechargeable battery 100 can be increased, thereby enabling the rechargeable battery 100 to be more smoothly bent.

Specifically, the rechargeable battery 100 according to the present disclosure may satisfy [Equation 1].

$$0.5n \times ML \leq H \quad \text{[Equation 1]}$$

Herein, n denotes the number of first or second bent portions, ML denotes a length of the margin portion in the length direction of the rechargeable battery, and H denotes a height of the reinforcement member.

Referring to FIG. 3, the height H of the reinforcement member 60 may be smaller than or equal to the half of a value obtained by multiplying the length ML of the margin portion 225 and the number of at least one of the first bent portion 51a and the second bent portion 52a.

[Equation 1] can be derived from [Equation 1-1] and [Equation 1-2].

$$2a \times n = ML \quad \text{[Equation 1-1]}$$

$$a \leq H \quad \text{[Equation 1-2]}$$

Herein, a denotes a length of one side of first bent portion or the second bent portion.

That is, when the first bent portion 51a or the second bent portion 52a is bent into the shape of "Λ" having an isosceles shape, a in [Equation 1-1] and [Equation 1-2] denotes a length of one side of the first bent portion 51a or the second bent portion 52a. When the rechargeable battery 100 includes a plurality of first bent portions 51a or a plurality of second bent portions 52a and one side of each of the bent portions 51a and 52a is different, a denotes a length of a long side.

Referring to FIG. 3, as shown in [Equation 1-1], the length ML of the margin portion 225 with respect to the length direction of the rechargeable battery 100 may be the same as a length of the first electrode tab 51 or the second electrode tab 52 when the first bent portion 51a or the second bent portion 52a of the first electrode tab 51 or the second electrode tab 52 is fully opened.

In addition, when the first bent portion 51a or the second bent portion 52a is compressed and thus a vertical shape "⊥" is formed, the maximum height of the first bent portion 51a or the second bent portion 52a during a bending process of the rechargeable battery 100 may be the same as a, which is the length of one side.

Thus, the height of the reinforcement member 60 needs to be the same as a or higher than a such that the deformation freedom of the electrode assembly 10 and the first electrode tab 51 or the second electrode tab 52 in the thickness direction can be assured.

Meanwhile, the rechargeable battery 100 according to the present disclosure may satisfy [Equation 2] and [Equation 3] when being bent.

[Equation 2]

Herein, R denotes a curvature radius when the rechargeable battery is bent, L denotes a length of a long side of the rechargeable battery, and n denotes the number of the first bent portion or the second bent portion.

$$ht + h2 - 0.5h1 \leq H \quad \text{[Equation 3]}$$

Herein, ht denotes a height of the electrode assembly, h2 denotes a height of the first bent portion or the second bent portion, h1 denotes a height of the first electrode, and H denotes a height of the reinforcement member.

When the rechargeable battery includes a plurality of first bent portions 51a or a plurality of second bent portions 52a and the respective bent portions 51a and 52a have different heights, h2 implies the highest height among heights of the respective bent portions 51a and 52a.

[Equation 2] may be derived from [Equation 2-1] and [Equation 2-2].

$$ht \leq H \quad \text{[Equation 2-1]}$$

That is, as described above, [Equation 2-1] shows that the height H of the reinforcement member 60 needs to be the same as or higher than the height ht of the electrode assembly 10 such that the deformation freedom in the thickness direction can be assured when the rechargeable battery 100 is bent.

$$ht \times \frac{L}{2R} = ML \qquad \text{[Equation 2-2]}$$

As described above, the margin portion 225 accommodates a length change of the electrode assembly 10 when the rechargeable battery 100 is bent.

For this, when the rechargeable battery 100 is circularly bent, a length ML of the margin portion 225 in the length direction of the rechargeable battery 100 may be the same as a value obtained by multiplying the height ht of the electrode assembly 10 and a value obtained by dividing the length L of the long side of the rechargeable battery by two times the curvature radius R.

Meanwhile, [Equation 2-3] can be obtained by applying [Equation 1] to [Equation 2-1], and [Equation 2] can be obtained by applying [Equation 2-2] to [Equation 2-3].

$$ht \leq 0.5n \times ML \qquad \text{[Equation 2-3]}$$

Thus, as shown in [Equation 3], the height H of the reinforcement member 60 needs to be equal to or larger than a value obtained by subtracting a value obtained by dividing the height of the first electrode 11 or the second electrode 12 by half from a value obtained by adding the height of the first bent portion 51a or the second bent portion 52a to the height ht of the electrode assembly 10.

When the height of the reinforcement member 60 satisfies [Equation 1] and [Equation 3] in the rechargeable battery 100 according to the present disclosure, the rechargeable battery 100 can be effectively prevented from being damaged when the rechargeable battery 100 is iteratively bent by further improving flexibility of the rechargeable battery 100.

Meanwhile, the reinforcement member 60 may be disposed in the receiving portion 125 where the electrode assembly 10 is received at a distance from the electrode assembly 10, and may accommodate a length change of the electrode assembly 10 in the thickness direction (z-axis direction).

More specifically, the reinforcement member 60 may be fixed to an empty space at an end of one side through which the first electrode tab 51 and the second electrode tab 52 are drawn out in the receiving portion 125 of the first exterior member 25.

That is, the reinforcement member 60 may be disposed adjacent to at least one of the first electrode tab 51 and the second electrode tab 52, and a surface where the reinforcement member 60 is attached is not specifically limited as long as a margin in the thickness direction (z-axis direction) of the rechargeable battery 100 can be assured.

Referring to FIG. 2, the reinforcement member 60 according to the present exemplary embodiment may include a first reinforcement member 61 that is disposed between the first electrode tab 51 and the second electrode tab 52.

FIG. 2 illustrates a case in which the first reinforcement member 61 is disposed between the first electrode tab 51 and the second electrode tab 52 while disposed to contact one side of the receiving portion 125. In this case, although it is not illustrated, the first reinforcement member 61 is disposed at a predetermined distance from one side of the receiving portion 125.

Figure 5:
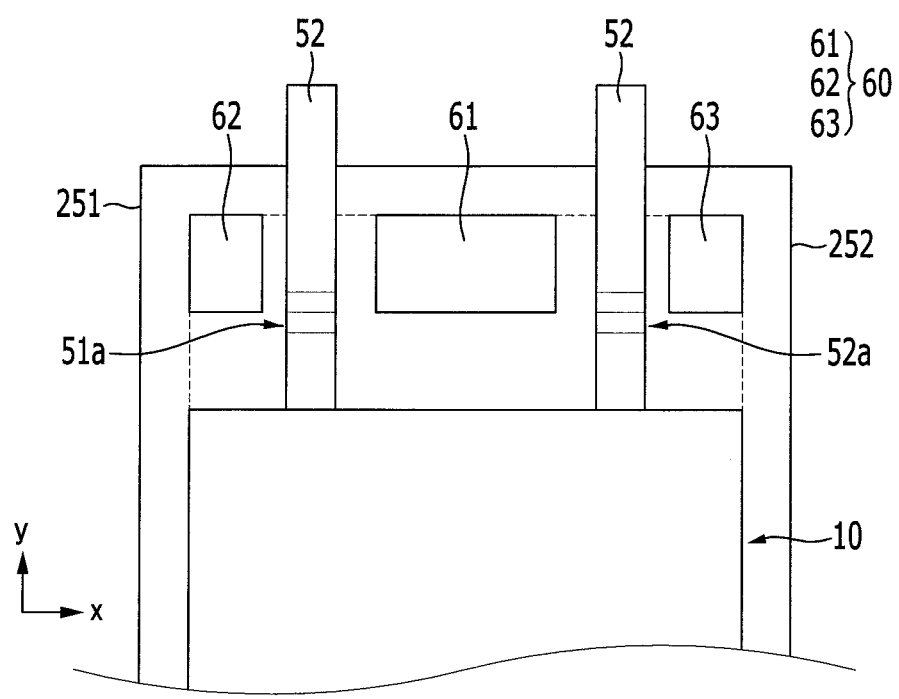
FIG. 5 and FIG. 6 show exemplary variations with respect to a location of a reinforcement member in FIG. 1.
Figure 6:
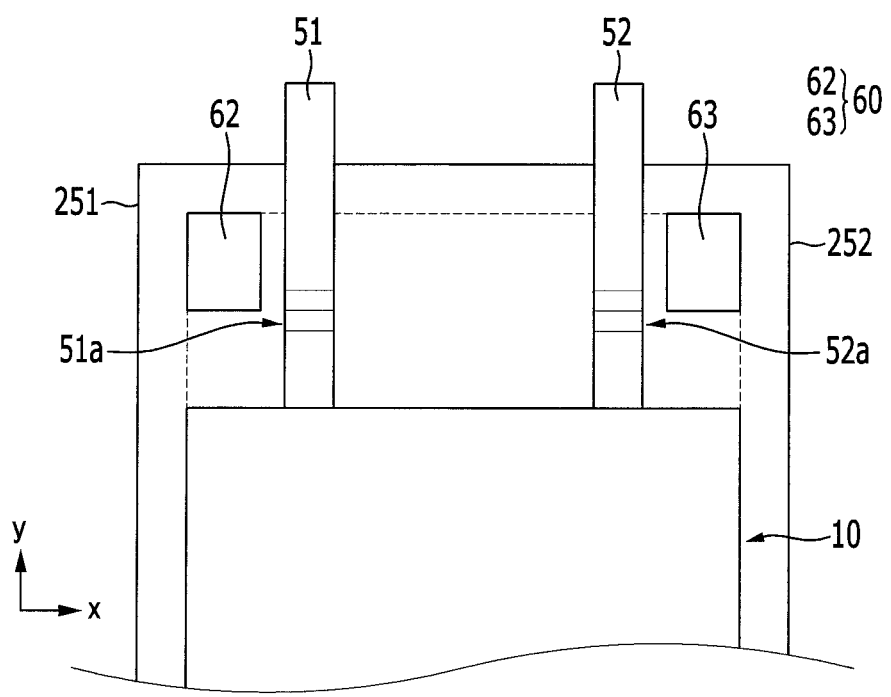

FIG. 5 and FIG. 6 show exemplary deformations with respect to a location of the reinforcement member in FIG. 1.

The first exterior member 25 may have, for example, a rectangular shape having a pair of long sides and a pair of short sides. Among the pair of long sides, a long side of the first exterior member 25 disposed at the left side of the first electrode tab 51 with reference to FIG. 5 is called a first long side 251, and a long side of the first exterior member 25 disposed at the right side of the second electrode 52 is called a second long side 252.

Referring to FIG. 5, the reinforcement member 60 may include the first reinforcement member 61, a second reinforcement member 62, and a third reinforcement member 63.

The first reinforcement member 61 may be disposed between the first electrode tab 51 and the second electrode tab 52 when viewed from a horizontal cross-section (i.e., x-y plane) of the rechargeable battery 100. In addition, the second reinforcement member 62 may be disposed between the first electrode tab 51 and the first long side 251 of the first exterior member 25. The third reinforcement member 63 may be disposed between the second electrode 52 and the second long side 252 of the first exterior member 25.

In FIG. 5, all of the first reinforcement member 61, the second reinforcement member 62, and the third reinforcement member 63 are disposed while contacting at least one side surface of the receiving portion 125 for convenience of description, but all or some of the first reinforcement member 61, the second reinforcement member 62, and the third reinforcement member 63 may be disposed while not contacting the side surface of the receiving portion 125.

Referring to FIG. 6, the reinforcement member 60 may include the second reinforcement member 62 and the third reinforcement member 63.

The second reinforcement member 62 may be disposed between the first electrode tab 51 and the first long side 251 of the first exterior member 25. The third reinforcement member 63 may be disposed between the second electrode tab 52 and the second long side 252 of the first exterior member 25.

In FIG. 6, for convenience of description, both of the second reinforcement member 62 and the third reinforcement member 63 are disposed while contacting at least one side surface of the receiving portion 125, but both or one of the second reinforcement member 62 and the third reinforcement member 63 may be disposed while not contacting the side surface of the receiving portion 125.

As described above, when the rechargeable battery 100 includes a plurality of reinforcement members 60, it is possible to implement a battery which can more stably accommodate a change in length in the thickness direction when the rechargeable battery 100 is bent.

Figure 7:
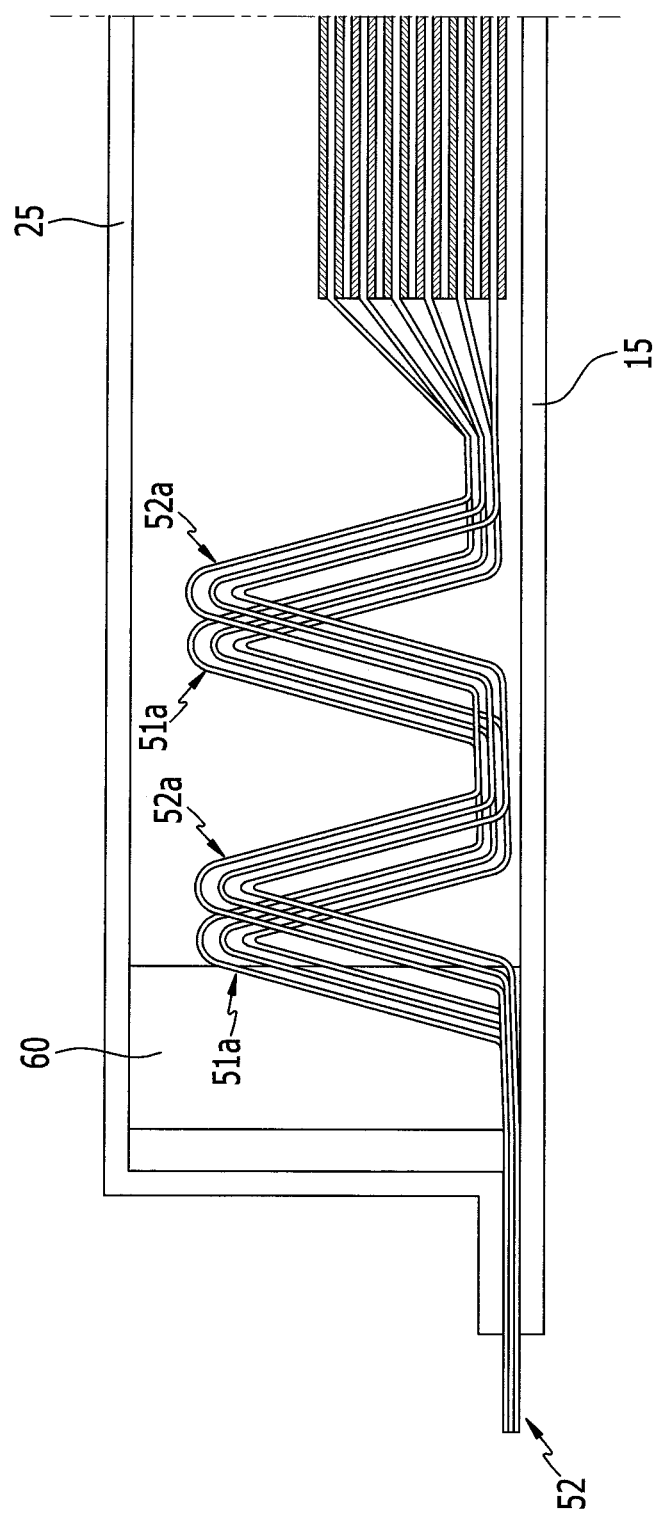
FIG. 7 and FIG. 8 show partial cross-sectional views of rechargeable batteries according to different exemplary embodiments of the present disclosure.

FIG. 7 shows a partial cross-sectional view of a rechargeable battery according to another exemplary embodiment of the present disclosure.

Referring to FIG. 7, a first electrode tab 51 and a second electrode tab 52 may respectively include two or more first bent portions 51a and second bent portions 52a.

For convenience of description, FIG. 7 illustrates a case in which the first electrode tab 51 and the second electrode tab 52 respectively include two first bent portions 51a and two second bent portions 52a. However, the number of bent portions is not limited thereto.

For example, the first electrode tab 51 may include one first bent portion 51a and the second electrode tab 52 may include two or more second bent portions 52a, or on the contrary, the first electrode tab 51 may include two or more first bent portions 51a and the second electrode tab 52 may include one second bent portion 52a. Alternatively, the first electrode tab 51 and the second electrode tab 52 may both include three or more first bent portions 51a and three or more second bent portions 52a.

However, for balanced bending of the rechargeable battery 100, the number of the first bent portions 51a included in the first electrode tab 51 and the number of second bent portions 52a included in the second electrode tab 52 are preferably equal to each other.

The first bent portion 51a and/or the second bent portion 52a are included in plural, and as shown in FIG. 7, they may be connected with each other at a distance from each other.

In this case, more space where deformation in length of the first and second electrode tabs 52 in a length direction of the rechargeable battery can be assured, and accordingly durability of the rechargeable battery can be more improved even when the rechargeable battery is iteratively bent.

The rechargeable battery according to the present exemplary embodiment is the same as the rechargeable battery according to the exemplary embodiment of FIG. 1 to FIG. 6, except that the first bent portion 51a and the second bent portion 52a may be provided in plural in the first electrode tab 51 and/or in the second electrode tab 52. Accordingly, further detailed description of features of the rechargeable battery, except that the first bent portion 51a and the second bent portion 52a are provided in plural, will be omitted.

Figure 8:
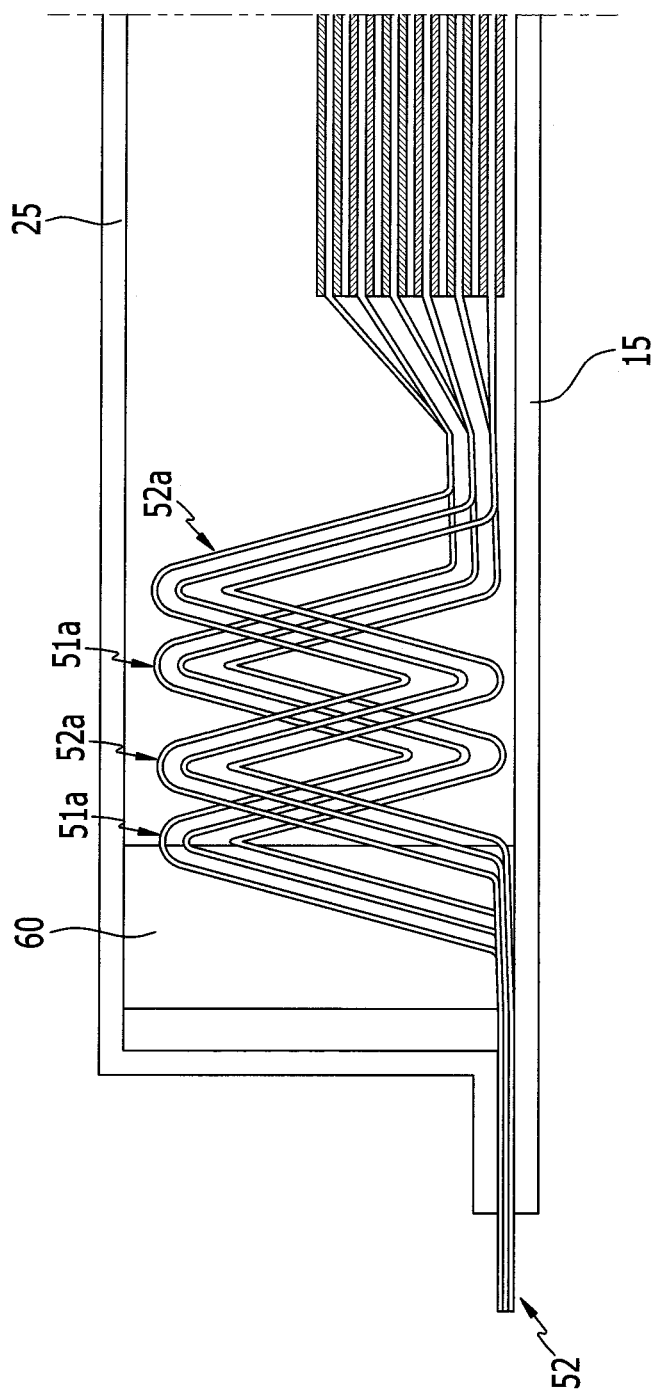

FIG. 8 shows a partial cross-sectional view of a rechargeable battery according to another exemplary embodiment of the present disclosure.

Referring to FIG. 8, a first electrode tab 51 and a second electrode tab 52 may respectively include two or more first bent portions 51a and two or more second bent portions 52a.

For convenience of description, FIG. 8 illustrates a case in which the first electrode tab 51 and the second electrode tab 52 both include two first bent portions 51a and two second bent portions 52a. However, the number of bent portions is not limited thereto.

For example, the first electrode tab 51 may include one first bent portion 51a and the second electrode tab 52 may include two or more second bent portion 52a, and on the contrary, the first electrode tab 51 may include two or more first bent portions 51a and the second electrode tab 52 may include one second bent portion 52a. Alternatively, the first electrode tab 51 and the second electrode tab 52 both may include three or more first bent portions 51a and three or more second bent portions 52a.

However, for balanced bending of the rechargeable battery 100, the number of the first bent portions 51a included in the first electrode tab 51 and the number of second bent portions 52a included in the second electrode tab 52 are preferably equal to each other.

The first bent portion 51a and/or the second bent portion 52a are included in plural, and as shown in FIG. 8, they may be continuously connected with each other.

In this case, an electrode assembly disposed in the rechargeable battery may extend longer in a length direction, and accordingly, the rechargeable battery can have an excellent capacity feature while assuring flexibility.

The rechargeable battery according to the present exemplary embodiment is the same as the rechargeable battery according to the exemplary embodiment of FIG. 1 to FIG. 6, except that the first bent portion 51a and the second bent portion 52a may be provided in plural in the first electrode tab 51 and/or in the second electrode tab 52. Accordingly, further detailed description of features of the rechargeable battery, except that the first bent portion 51a and the second bent portion 52a are provided in plural, will be omitted.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: rechargeable battery
11: first electrode
12: second electrode
13: separator
51: first electrode tab
52: second electrode tab
25: first exterior member
15: second exterior member
60: reinforcement member

The invention claimed is:

1. A rechargeable battery comprising:
an electrode assembly that includes a first electrode, a second electrode, and a separator disposed between the first electrode and the second electrode;
a first electrode tab that is electrically connected with the first electrode, and includes at least one first bent portion;
a second electrode tab that is electrically connected with the second electrode, and includes at least one second bent portion;
a first exterior member that receives the electrode assembly;
a second exterior member that seals the first exterior member; and
a reinforcement member that is disposed in the first exterior member, while being disposed adjacent to at least one of the first electrode tab and the second electrode tab, wherein the reinforcement member is spaced apart from the first electrode tab, the second electrode tab, and the electrode assembly,
wherein the reinforcement member has a height that is higher than the electrode assembly,
wherein the first exterior member comprises a receiving portion where the electrode assembly is embedded and a margin portion that is disposed adjacent to the receiving portion in a length direction of the electrode assembly, and
wherein the reinforcement member physically contacts at least one side surface of the receiving portion through which the first electrode tab and the second electrode tab are drawn out.

2. The rechargeable battery of claim 1, wherein the rechargeable battery satisfies [Equation 1]:

$$0.5n \times ML \leq H \qquad \text{[Equation 1]}$$

(where n is the number of first bent portions or the number of second bent portions, ML denotes a length of the margin portion in the length direction of the rechargeable battery, and H denotes a height of the reinforcement member).

3. The rechargeable battery of claim 1, wherein the rechargeable battery satisfies [Equation 2] and [Equation 3] when being bent:

$$4R \leq L \times n \qquad \text{[Equation 2]}$$

(where R denotes a curvature radius of the rechargeable battery when being bent, L denotes a length of a long side of the rechargeable battery, and n denotes the number of the first bent portions or second bent portions), $$ht + h2 - 0.5h1 \leq H \qquad \text{[Equation 3]}$$

(where ht denotes a height of the electrode assembly, h2 denotes a height of any bent portion, H denotes a height of the reinforcement member, and h1 denotes a height of the first electrode).

4. The rechargeable battery of claim 1, wherein the reinforcement member comprises a first reinforcement member that is disposed between the first electrode tab and the second electrode tab.

5. The rechargeable battery of claim 4, wherein the first exterior member comprises a pair of long sides and a pair of short sides, which face each other, while the reinforcement member further comprises a second reinforcement member disposed between the first electrode tab and a first long side of the first exterior member, and a third reinforcement member disposed between the second electrode tab and a second long side of the first exterior member.

6. The rechargeable battery of claim 1, wherein the reinforcement member comprises:

a second reinforcement member disposed between the first electrode tab and a long side of the first exterior member, and a third reinforcement member disposed between the second electrode tab and a long side of the first exterior member.

7. The rechargeable battery of claim 1, wherein the at least one first bent portion includes two or more first bent portions that are continuously connected with each other.

8. The rechargeable battery of claim 1, wherein the at least one first bent portion includes two or more first bent portions that are disposed at a predetermined distance from each other.

9. The rechargeable battery of claim 1, wherein the at least one second bent portion includes two or more second bent portions that are continuously connected with each other.

10. The rechargeable battery of claim 1, wherein the at least one second bent portion includes two or more second bent portions that are disposed at a predetermined distance from each other.

11. The rechargeable battery of claim 1, wherein the first electrode comprises a first current collector, and wherein the first electrode tab is integrally connected to the first current collector and then extended.

12. The rechargeable battery of claim 1, wherein the second electrode comprises a second current collector, and wherein the second electrode tab is integrally connected to the second current collector and then extended.

* * * * *